(No Model.)

G. B. SHEPHERD.
CARPET OR RUG FASTENER.

No. 605,978. Patented June 21, 1898.

Inventor
George B. Shepherd.

Witnesses
J. Grant Culverwell.
Edwin Cruse.

By his Attorneys,
C. A. Snow & Co.

UNITED STATES PATENT OFFICE.

GEORGE B. SHEPHERD, OF GRAYSON, KENTUCKY.

CARPET OR RUG FASTENER.

SPECIFICATION forming part of Letters Patent No. 605,978, dated June 21, 1898.

Application filed September 14, 1897. Serial No. 651,662. (No model.)

*To all whom it may concern:*

Be it known that I, GEORGE B. SHEPHERD, a citizen of the United States, residing at Grayson, in the county of Carter and State of Kentucky, have invented a new and useful Carpet or Rug Fastener, of which the following is a specification.

This invention relates to rug-fasteners, its objects being to provide a simple and efficient device by means of which a rug may be detachably secured to a carpet or to the floor and in which the hooks or teeth on the fastener are so disposed that when the fastener is attached to the corner of the rug diagonally the teeth will pull on the rug in all directions radially from the corner.

With these objects in view the invention consists of the several details of construction and arrangement of parts, as will be hereinafter fully described, and particularly pointed out in the claim.

Figure 1:
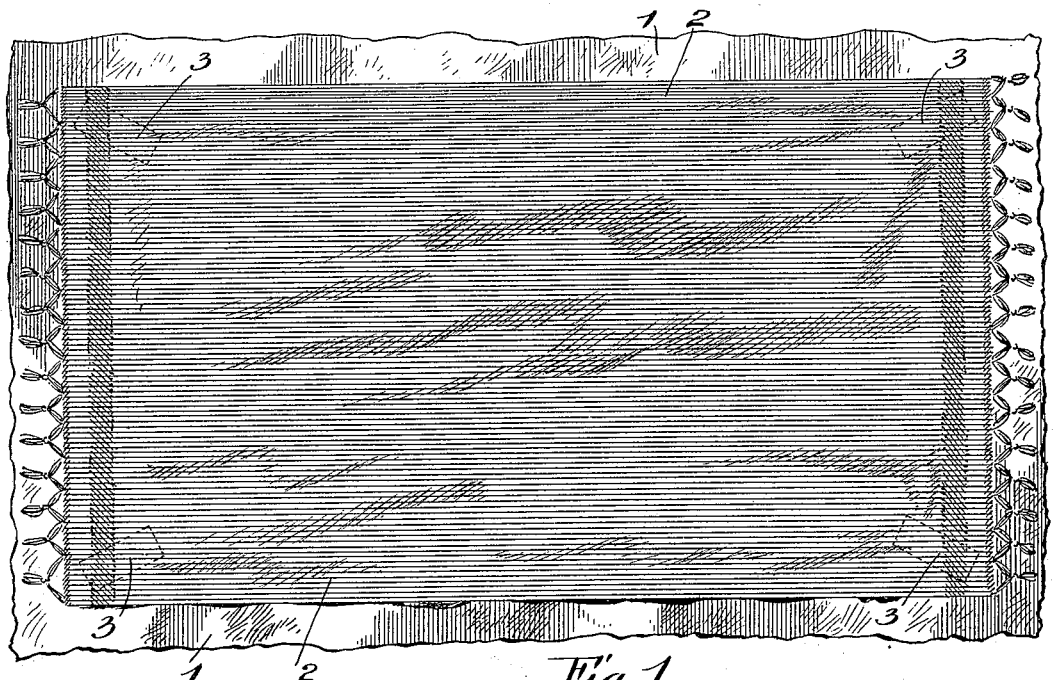
Figure 2:
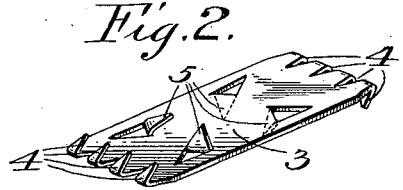
Figure 3:
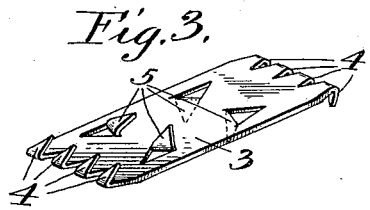
Figure 4:
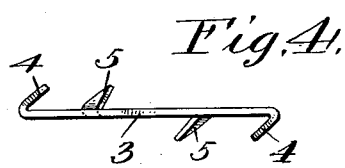
Figure 5:
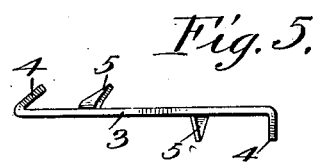
Figure 6:
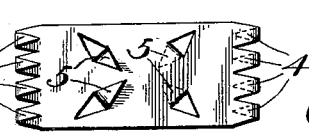

In the drawings, Figure 1 is a plan view of a rug and a portion of a carpet, showing the fastener in dotted lines in its proper position at the corners of the rug. Fig. 2 is a perspective view of the fastener used to secure a rug to a carpet. Fig. 3 is a similar view of the fastener used to secure a rug or carpet directly to the floor. Fig. 4 is an edge view of Fig. 2. Fig. 5 is an edge view of Fig. 3. Fig. 6 is a plan view of Fig. 2.

Similar reference-numerals indicate similar parts in the several figures.

1 indicates the carpet, and 2 the rug. The fastener is indicated by 3, and consists, preferably, of an oblong rectangular strip of sheet metal, preferably steel, having a series of pointed teeth 4 formed at each end, the teeth at one end of the strip being bent in a direction opposite to that in which the teeth at the other end are bent.

Near each end of the strip two pointed teeth 5 are struck up from the body of the fastener, the pair of teeth at the respective ends projecting from the face of the fastener in the same direction as the end teeth 4 to which they are respectively nearest. As clearly shown in Fig. 6, the teeth 5 are diagonally arranged relatively to the fastener, and the teeth at each end are disposed at substantially a right angle to each other—that is, if lines were drawn across the body of the strip parallel to the broad face of the respective teeth such lines would intersect each other at substantially a right angle.

When the fastener is used to secure a rug to a carpet, all the teeth of the fastener will be bent into hook shape, as shown in Figs. 2 and 4, and the fastener will first be secured at one end to the under side of the rug at the corner by hooking the upwardly-projecting teeth into the rug in such manner that the fastener will extend diagonally, as shown in Fig. 1, and the downwardly-projecting teeth will then be hooked into the carpet. The other corners of the rug will then be secured in a similar manner, the rug being stretched sufficiently at the corners to put enough strain on the teeth of the respective fasteners to hold them securely engaged with the rug and carpet, respectively. When so secured, it will be seen that the end teeth 4 of all the fasteners which engage the rug will pull on the rug toward the center thereof, and the several teeth 5, which engage the rug, will pull on the respective sides and ends of the rug in opposite directions, and the rug will thus be kept stretched in every direction, and the strain on the carpet will also be distributed radially from the fastener. These divergent strains will also tend to keep the fasteners in position and render them less liable to become detached.

When the rug or carpet is secured to the floor, the downwardly-projecting teeth 4 and 5 will be straight, in order that they can be readily forced into the floor; but otherwise the operation will be the same as already described, and all the advantages will be present whether the rug be secured to the carpet or to the floor.

From the foregoing description it will be seen that I have produced an exceedingly simple and efficient device for detachably securing a rug at its corners, either to a carpet or to the floor, and that such fastener will exert a uniform strain on the rug radially from each corner. The device can also be used to fasten a carpet to the floor, and when so used the ordinary tacks, which are injurious to fine carpets, may be entirely dispensed with. It is also obvious that the device can be very cheaply manufactured, and also that it will not injure the rug or carpet and will also be entirely out of sight when in use.

It will be understood that changes in the form, proportion, and the minor details of construction may be resorted to without departing from the spirit or sacrificing any of the advantages of this invention.

Having thus described the invention, what I claim is—

A carpet or rug fastener, formed from a strip of sheet metal having pointed teeth at each end, and a series of diagonally-disposed teeth struck up from the strip within its edges near each end, the teeth at one end and the adjacent diagonally-disposed teeth being bent in the opposite direction to the similar teeth at the other end portion of the strip, substantially as described.

In testimony that I claim the foregoing as my own I have hereto affixed my signature in the presence of two witnesses.

GEORGE B. SHEPHERD.

Witnesses:
J. G. AULT,
H. F. IRWIN.